Figure 1:
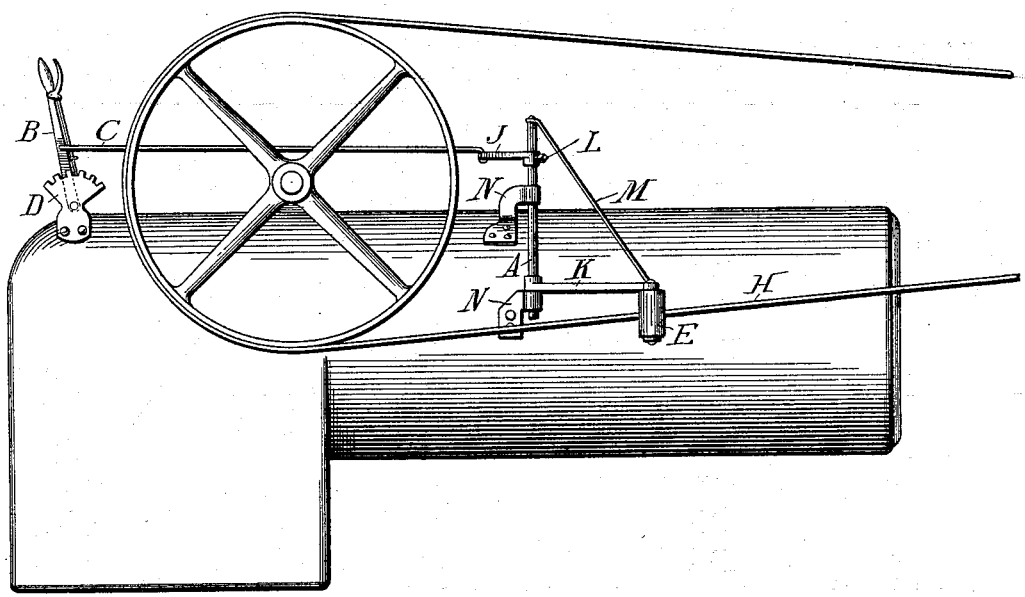
Figure 2:
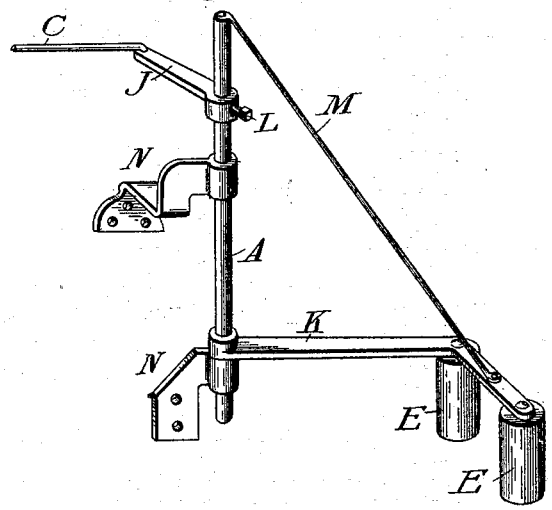

No. 648,403. Patented May 1, 1900.
A. E. HADLEY & F. TIELEBEIN.
ADJUSTABLE BELT GUIDE.
(Application filed Aug. 17, 1899.)

(No Model.)

Witnesses.
John Azzmus
Minnie Maack

Inventors.
Albert E. Hadley
Frederick Tielebein

UNITED STATES PATENT OFFICE.

ALBERT E. HADLEY, OF MOUNT VERNON, AND FREDERICK TIELEBEIN, OF PLANKINTON, SOUTH DAKOTA.

ADJUSTABLE BELT-GUIDE.

SPECIFICATION forming part of Letters Patent No. 648,403, dated May 1, 1900.

Application filed August 17, 1899. Serial No. 727,611. (No model.)

*To all whom it may concern:*

Be it known that we, ALBERT E. HADLEY, of Mount Vernon, Davison county, and FREDERICK TIELEBEIN, of Plankinton, Aurora county, South Dakota, have invented a certain new and useful Improvement in Adjustable Belt-Guides; and we do hereby declare the following to be a full, clear, and exact description of the invention, such as will enable others skilled in the art to which it appertains to make and use the same.

This invention relates to improvements in adjustable belt-guides; and the objects of the same are, first, to prevent the belt from being thrown from the pulley or band-wheel by wind or other causes, and, second, to provide means by which the belt may be removed from the pulley or band-wheel at the option of the operator or engineer when applied to farm or threshing engines or wherever employed while the machine is in motion and without the operator leaving his position. We attain these objects by the mechanism illustrated in the accompanying drawing, in which—

A is a shaft to which are attached two arms J and K. The arm K carries two rollers E E. Between these rollers the belt H runs. The arm J is secured in the desired position upon the shaft A by means of a set-screw L.

B is a lever attached to a quadrant D, said quadrant being provided with notches to receive a pawl on lever B, thus holding lever B in the desired position. The arm J and the lever B are connected by means of a connecting-rod C. M is a brace from shaft A to the outer extremity of arm K.

To operate, the guide is placed near the pulley in such position that the part of the belt running toward the driving-pulley will pass between the rollers E E, the guide being supported by brackets N N, through which the shaft A passes and which allow said shaft to rotate freely. The arm K, carrying the rollers E E, is then secured in the desired position with relation to the belt by means of the lever B and quadrant D and connections above described.

To remove the belt from the pulley, the lever B is shifted to the extremity of quadrant D. Thus by means of the connections above described the arm K and the rollers attached thereto are made to move in the arc of a circle, the rollers carrying the belt with them and removing it from the pulley.

It is evident that many minor changes within the spirit and scope of our invention, such as will suggest themselves to the mind of a skilled mechanic, might be made. Hence we do not limit ourselves to the exact construction described. Also the construction of parts may be varied to suit construction of various engines or other machines on which the belt-guide is to be used.

What we claim as our invention, and desire to secure by Letters Patent, is—

The combination in a belt-guide of a shaft, brackets for supporting the shaft and in which it rotates freely, two arms, two rollers carried by one of said arms, and between which rollers the belt passes, the other arm being adjustable on the shaft, means for securing said arm in the desired position, and a lever connected to said arm, substantially as described.

ALBERT E. HADLEY.
FREDERICK TIELEBEIN.

Witnesses:
O. McEWEN,
H. M. MABBOTT.